(12) United States Patent
Stanton

(10) Patent No.: US 12,651,041 B2
(45) Date of Patent: Jun. 9, 2026

(54) BLACKBOX OPTIMIZATION VIA MODEL ENSEMBLING

(71) Applicant: Etsy, Inc., Brooklyn, NY (US)

(72) Inventor: Andrew Stanton, Brooklyn, NY (US)

(73) Assignee: Etsy, Inc., Brooklyn, NY (US)

( * ) Notice: Subject to any disclaimer, the term of this patent is extended or adjusted under 35 U.S.C. 154(b) by 1109 days.

(21) Appl. No.: 17/348,388

(22) Filed: Jun. 15, 2021

(65) Prior Publication Data

US 2022/0405531 A1 Dec. 22, 2022

(51) Int. Cl.
| | |
|---|---|
| *G06N 20/20* | (2019.01) |
| *G06F 17/18* | (2006.01) |
| *G06F 18/214* | (2023.01) |

(52) U.S. Cl.
CPC .......... *G06F 18/2148* (2023.01); *G06F 17/18* (2013.01); *G06N 20/20* (2019.01)

(58) Field of Classification Search
CPC ..... G06F 18/2148; G06F 17/18; G06N 20/20; G06N 5/01; G06N 5/045; G06N 7/01
See application file for complete search history.

(56) References Cited

U.S. PATENT DOCUMENTS

| | | | | |
|---|---|---|---|---|
| 11,354,594 | B2 * | 6/2022 | Chen ........................ | G06F 17/18 |
| 2019/0179917 | A1 * | 6/2019 | Agrawal ............. | G06F 16/9537 |
| 2020/0364542 | A1 * | 11/2020 | Sun ........................ | G06N 3/084 |
| 2022/0180242 | A1 * | 6/2022 | Lee ........................ | G06N 3/047 |

FOREIGN PATENT DOCUMENTS

WO WO 2020149971 7/2020

OTHER PUBLICATIONS

Daoud, Eduard et al. "Enhancing Fake Product Detection Using Deep Learning Object Detection Models." Iadis International Journal on Computer Science and Information Systems (Year: 2020).*
Zhao, Pu & Chen, Pin-Yu & Wang, Siyue & Lin, Xue. (2020). Towards Query-Efficient Black-Box Adversary with Zeroth-Order Natural Gradient Descent. 10.48550/arXiv.2002.07891. (Year: 2020).*

(Continued)

*Primary Examiner* — Jeremy L Stanley
*Assistant Examiner* — Gisel Gabriela Faccenda
(74) *Attorney, Agent, or Firm* — Fish & Richardson P.C.

(57) ABSTRACT

Methods, systems, and apparatus, including computer programs encoded on a computer storage medium, for optimizing a plurality of parameters of a black box system with respect to a distribution of the plurality of parameters are disclosed. Methods can include obtaining a fitness function of the black box system and a training dataset including multiple training samples. Methods can further include training an ensemble of machine learning model wherein during each iteration of the training process an output of the system is generated for each of the multiple training samples. During each iteration, a predictive value is also generated using an ensemble of machine learning models. A natural gradient is determined based on the output of the system and the predictive value. The ensemble of machine learning models is then trained using the natural gradient.

15 Claims, 4 Drawing Sheets

(56) References Cited

OTHER PUBLICATIONS

Evans, Benjamin & Xue, Bing & Zhang, Mengjie. (2019). What's inside the black-box?: a genetic programming method for interpreting complex machine learning models. 1012-1020. 10.1145/3321707. 3321726. (Year: 2019).*

Duan, Tony et al. "NGBoost: Natural Gradient Boosting for Probabilistic Prediction." International Conference on Machine Learning (Year: 2019).*

Mandal, Shantanu & Anderson, Todd & Turek, Javier & Gottschlich, Justin & Zhou, Shengtian & Muzahid, Abdullah. Learning Fitness Functions for Machine Programming. 10.48550/arXiv.1908.08783. (Year: 2021).*

International Search Report and Written Opinion in International Appln. No. PCT/US2022/029407, mailed on Aug. 19, 2022, 17 pages.

Thebelt et al., "ENTMOOT: A Framework for Optimization over Ensemble Tree Models," CoRR, submitted on Mar. 10, 2020, arXiv:2003.04774, 23 pages.

International Preliminary Report on Patentability in International Appln. No. PCT/US2022/029407, mailed on Dec. 14, 2023, 11 pages.

* cited by examiner

Trained ensemble of machine learning model
160

Training samples X
106

Training Dataset
105

Ensemble of Machine Learning Models
120

Predicted Values
126

Training samples X
106

Gradient Computing Apparatus
155

Output
175

Black Box System
150

Training Engine
140

Black Box Optimization Apparatus
100

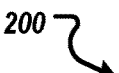

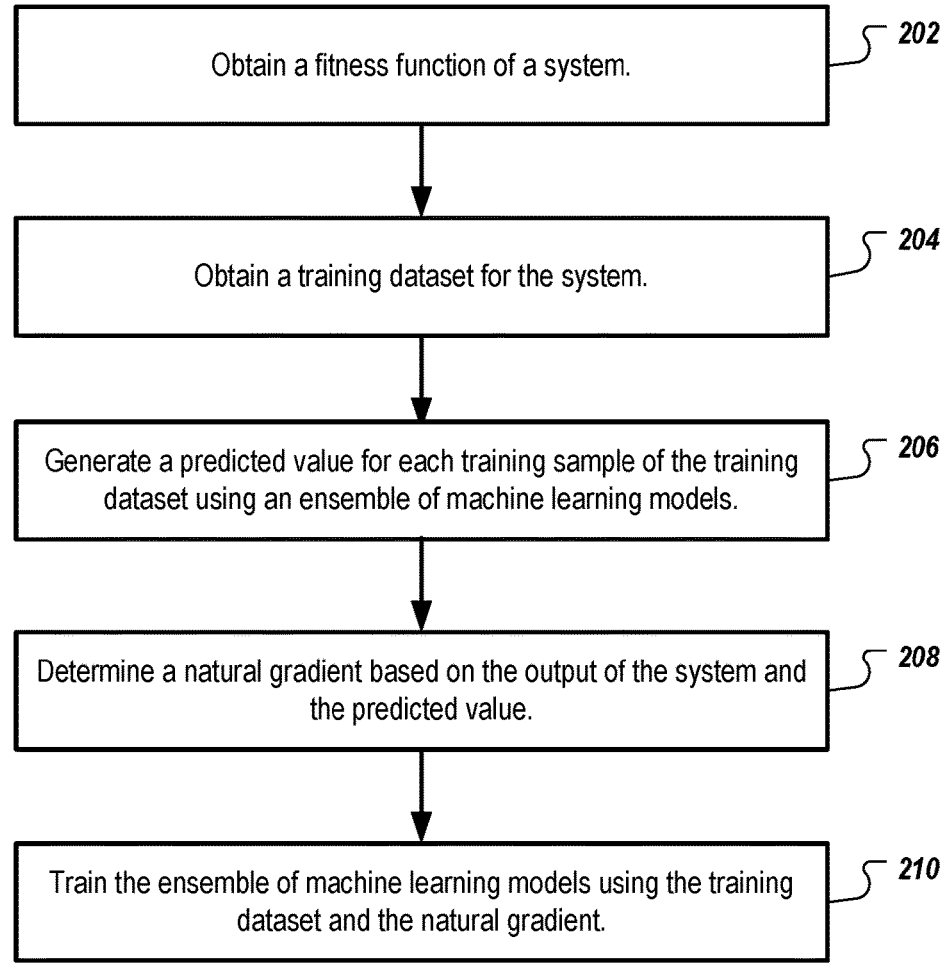

| | |
|---|---|
| Obtain a fitness function of a system. | 202 |
| Obtain a training dataset for the system. | 204 |
| Generate a predicted value for each training sample of the training dataset using an ensemble of machine learning models. | 206 |
| Determine a natural gradient based on the output of the system and the predicted value. | 208 |
| Train the ensemble of machine learning models using the training dataset and the natural gradient. | 210 |

FIG. 2

BLACKBOX OPTIMIZATION VIA MODEL ENSEMBLING

BACKGROUND

This specification relates to data processing and black box optimization.

A system can include a number of adjustable parameters that affect the quality, performance, and/or outcome of the system. Identifying parameter values that optimize the performance of the system can be challenging, particularly when the system is complex or includes a significant number of adjustable parameters. In particular, any sufficiently complex system acts as a black box when it becomes easier to experiment with than to understand. Hence, black box optimization has become increasingly important as systems have become more complex.

SUMMARY

In general, one innovative aspect of the subject matter described in this specification can be embodied in methods including the operations of optimizing a plurality of parameters of a black box system based on an expected fitness of the system with respect to a distribution of the plurality of parameters, the computer-implemented method including: obtaining a fitness function of the black box system; obtaining a training dataset comprising multiple training samples, wherein each training example comprises the plurality of features; performing, by one or more computing devices, one or more iterations of a sequence of operations, including: generating, for each of the multiple training samples using the black box system, an output of the black box system; generating, for each of the multiple training samples using an ensemble of machine learning models, a predicted value; determining, based on the output of the black box system and the predicted value for each of the multiple training samples, a natural gradient; and training the ensemble of machine learning models using the training dataset and the natural gradient.

These and other implementations can each optionally include one or more of the following features. In some aspects performing, one or more iterations of a sequence of operations can include: sampling one or more of the training samples of the training dataset to generate a batch of training samples; performing, for each training sample in the batch of training samples, a sequence of operations comprising: generating, for each of the multiple training samples using the black box system, an output of the black box system; generating, for each of the multiple training samples using an ensemble of machine learning models, a predicted value; determining, based on the output of the black box system and the predicted value for each of the multiple training samples, an estimate of the natural gradient; and training the ensemble of machine learning models using the training samples in the batch of training samples and the estimate of natural gradient.

In some aspects determining the natural gradient includes: perturbing, two or more times, the predicted value of the ensemble of machine learning models by adding noise; and computing the natural gradient of the predicted values based on the perturbed predicted values that maximizes the expected fitness using a relationship expressible as $$\nabla_{\hat{y}} E_{\epsilon \sim N(0,1)} F(\hat{y} + \sigma\epsilon) = \frac{1}{\sigma} E_{\epsilon \sim N(0,1)} F(\hat{y} + \sigma\epsilon)\epsilon,$$

where the predicted value $$\hat{y} = \sum_{i=0}^{j} M_i(X), \ M_i$$

is the ensemble of machine learning models during the i-th training iteration, $\sigma$ is the standard deviation of a Gaussian distribution.

In some aspects, perturbing the predicted value is based on a zero-centered Gaussian distribution parameterized by standard deviation $\sigma$.

In some aspects, determining a natural gradient based on the predicted value for each of the multiple training examples comprises determining the natural gradient using a relationship expressible as $\hat{y}_0 = \hat{y}$ and $$\nabla_{\hat{y}_t} = \frac{F(\hat{y}_t + \sigma\epsilon)\epsilon}{\sigma} - \hat{y}_t,$$

where $\hat{y}$ is the predicted value of a training example, F is the fitness function, $\epsilon$ is the Gaussian noise.

In some aspects, the ensemble of machine learning models includes Gradient Boosted Trees.

In some aspects, the black box system comprises is a system for which the closed form solution is unknown.

In some aspects, training the ensemble of machine learning models includes training an ensemble of ranking models that rank items using features of an input query.

In some aspects training the ensemble of machine learning models includes training an ensemble of counterfeiting models that output a probability of an item being a counterfeit based on features of a candidate item input to the counterfeiting models Particular embodiments of the subject matter described in this specification can be implemented so as to realize one or more of the following advantages. For example, the techniques described in this specification can optimize a black box system via an ensemble of machine learning models using techniques that are independent of the input parameters of the system thereby reducing the complexity of optimizing such a system. In contrast, existing techniques of optimizing such systems operate by optimizing in the space of input parameters that can be very computationally expensive (e.g., required a high level of computational resources). For example, as the number of parameters of the system increases, there is a quadratic increase in the number of search gradients in the parameter space, which will require exponentially more memory and computational power to complete the computation.

Black box optimization is a challenging field for several reasons. First, it is difficult to train due to an inherent lack of gradient information. Often, fitness functions contain multiple, competing objectives resulting in highly non-convex loss landscapes. Second, it is often difficult to interpret trained policies in a human readable way. This is particularly challenging in domains such as reinforcement learning, where modeling policies tend toward complex non-linear models, in particular neural networks, which are similarly black-box systems. Third, stakeholders responsible for explaining the actions of trained policies are challenged with interpreting black-box models.

Black-box optimization methods are also challenging because they are subject to the curse of dimensionality. The curse of dimensionality has the characteristic that when the dimensionality increases, the volume of the space increases at a rate that causes the available data become sparse. This resulting sparsity is a problem for solutions that require statistical significance because, in order to obtain a statistically sound result, the volume of data required to support the result can grow exponentially with the dimensionality. Further, because all objects appear to be sparse and dissimilar in many ways as the dimensionality grows, data organization strategies are no longer efficient.

Techniques that solve these problems are discussed throughout this specification, which include optimization techniques that leverage Decision Trees as base learners, and are able to optimize black-box functions in a variety of domains. For example, natural gradient trees ("NG-Trees") are simple to implement, are more efficient than many other black-box optimizers, and provide interpretable results in both supervised and reinforcement learning tasks. The techniques discussed herein can avoid the curse of dimensionality by preventing the exponential increase in complexity and computational resources required to complete computations, while still enabling optimization of black box systems. For example, the curse of dimensionality is avoided by computing gradients independently of the model parameters, which dramatically improves computational performance.

The techniques discussed throughout this specification can be used to improve the performance of various computer systems, including search engines, fraud detection systems, anti-counterfeiting systems, item listing taxonomy systems, recommendation systems, and image recommendation systems, to name a few. The accuracy of these systems can be improved without having to know the underlying relationships used by these systems. For instance, even if the machine learning system used to identify counterfeit items is a black box system, the techniques discussed herein can be used to improve the predictive accuracy of a system that uses that machine learning system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process of optimizing a black box model.

DETAILED DESCRIPTION

Figure 1:
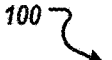
FIG. 1 is a block diagram of an example black box optimization apparatus.

This specification discloses methods, systems, apparatus, and computer readable media that are used to implement techniques of optimizing operating parameters of a black box system, product or process whose performance can be measured or evaluated as a function of those parameters. As used throughout this specification, the terms optimize, optimization, or variations thereof refer to relative improvements rather than a most optimal or best result.

In general, a black box system is a system for which the closed form solution is not known, but that can be evaluated based on the input that is provided to the black box system and the output generated by the black box system. That is, while the closed form of the system is not known, the output generated by the system for a given input can be evaluated.

Black box optimization can be described as the task of maximizing a fitness score of a fitness function (also referred to as an objective function) $F:X \rightarrow R$ with a limited budget for evaluations. The adjective "black-box" means that while the fitness function $F(x)$ can be evaluated for any $x \in X$, any other information about the fitness function F, such as gradients or the Hessian, is not known. When function evaluations are computationally expensive, it is desirable to carefully and adaptively select values to evaluate.

Examples of black box systems can include machine learning models that can be trained on an objective function. The machine learning model can be any of a variety of machine learning models, e.g., a deep neural network, a generalized linear model, or a support vector machine, configured to perform any of a variety of machine learning tasks, e.g., image processing tasks, speech recognition tasks, sequence transduction tasks, machine translation tasks, and so on. The objective function is generally a function that measures an error between the outputs generated by the machine learning model and outputs that should have been generated by the model. In this example, the black box system can be the training of the objective function, e.g., the loss function, as evaluated on a set of test inputs after the machine learning model has been trained using the objective function for some number of iterations or for some period of time. Examples of black box system can also include objective functions that can be some form of a reward function used in a reinforcement learning framework where the goal can be to find a suitable action model that would maximize the total cumulative reward of an agent acting in an environment.

In this example, the corresponding optimization problem can be to learn one or more hyper-parameters of the training process. A hyper-parameter is a value that affects the performance of the training process but that is not learned as part of the training process. Examples of hyper-parameters can include, e.g., learning rate, momentum rate, batch size, and so on. More generally, instead of, or in addition to, the hyper-parameters, the process parameters can include architecture settings for the machine learning model, e.g., number of hidden layers, types of hidden layers, number of nodes per hidden layer, number of convolutional layers, number and properties of filters of the convolutional layers, and so on.

The techniques and methods described in this specification optimize the black box system with respect to one or more parameters of the black box system e.g., in a way that maximizes the fitness score (also referred to as a fitness value). For example, the techniques and methods can determine the setting for the parameters that minimizes or maximizes the objective function based on the measure of performance of the black box system using natural gradient and gradient boosted trees. For example, if the objective function aims at reducing the loss generated during prediction, the techniques and methods can determine the setting for the parameters that minimizes the loss and maximizes the fitness score. In another example, if objective function is a reward function where the goal is to find a suitable action model that would maximize the total cumulative reward of an agent acting in an environment, the techniques and methods can determine the setting that maximizes the reward and the fitness score.

The techniques and methods of black box optimization are explained with reference to an example of an ecommerce website that provides a platform for buyers who use the platform to seek the most relevant and interesting item to purchase and sellers who use the platform as a tool to distribute items. However, the techniques discussed herein can be used in many different environments, and are directed to technical features related to solving the problem of how to perform black box optimization. A platform like the ecommerce platform can include multiple parameters (or features) that can be related to a particular aspect of the platform. For example, assume that the parameters describe a mechanism of assigning priority (or ranking) to items available for purchase on the platform and provided by different buyers. When users search for a particular type of item by querying the search system, the search system provides a list of items of the particular type that are provided by different sellers based on the assigned priority. In this example, the platform can alter the parameters of the mechanism of assigning priority to obtain different rankings. The black box here is the unknown underlying relationship of the parameters to revenue. In another example, the black box can be the unknown underlying relationship of the parameters to the number of sellers and/or buyers of the platform. As for another example, assume that the parameters of the mechanism can be used to simultaneously predict the revenue and the number of sellers of the ecommerce platform. Any changes to the parameters of the mechanism can affect the performance of the ecommerce platform in different ways. Such an unknown relationship between one or more variables, e.g., the revenue and the number of seller can be considered a black box system.

As for another example, the techniques and methods of black box optimization can be used to improve performance of search engines, fraud detection, anti-counterfeiting, document or e-marketplace listing taxonomies, recommendations, image recognition etc. For example, the e-commerce website can have a search engine that can generate search results of items based on a query provided by buyers. In such scenarios, the search engine can utilize language models that can process the query and relate the query to the actual products. Such a system can include multiple parameters that in some cases can be too complex for humans to understand. In such scenarios, the black box system can be the unknown underlying relationship of the multiple parameters to the items that the buyer may be looking for.

In another example, the black box system can be the unknown underlying relationship between features of an image that depicts an item to the category or type of item. For example, to provide the users, such as buyers, with a rich buying experience, e-commerce websites provide applications that can be downloaded into user devices allowing easier access to the e-commerce website. Users can use these applications to take pictures (e.g., capture images) of items in the real world, and the application can process the images so as to identify the items depicted in the images. The identified items can then be used to provide, as search results, items that are related to the item depicted in the image. In some situations, the application can upload the captured image to a cloud-based platform that can perform a similar, or more complex, processing to identify the item depicted in the image. Such processing may involve complex machine learning models such as convolutional neural networks (CNN) that can process the images and generate one or more features of the item that can be related to an item, or a type of item, available on the e-commerce website. In this situation, the techniques discussed herein can be used to optimize one or more of the image identification, as well as the item matching/listings created for presentation to the user.

The techniques discussed herein can be used in cloud-based web application interfaces and/or in mobile application interfaces (e.g., native mobile applications). For example, an e-commerce system in which these techniques can be implemented through a cloud-based web interface, or through a mobile application interface that is generated by a native mobile application executing on a mobile device.

FIG. 1 is a block diagram of an example black box optimization apparatus 100. The black box optimization apparatus 100 can be implemented (e.g., as computer programs) on one or more computers in one or more locations. The black box optimization apparatus 100 is configured to generate and provide a trained ensemble of machine learning models 160 that can be used to select the optimal parameters of the black box system 150 by training the ensemble of machine learning models 160 based on a training process that utilizes a natural gradient computed using a black box system 150.

The black box optimization apparatus 100 can include a training engine 140 that implements the training process to train an ensemble of machine learning models 120. The ensemble of machine learning model 120 is configured to receive, as input, training samples 106 from a training dataset 105 and generate, as output, a predictive value 126 based on the parameters of the ensemble of machine learning models 120.

For example, the relationship between the parameters of the mechanism of assigning priority and how these parameters affect predictions or outcomes is unknown, and hence referred to as a black box system 150. The black box optimization apparatus 100 can train an ensemble of machine learning models 120 to select the optimal parameters. To train the ensemble of machine learning models 120, the training process uses natural gradient generated using a black box system 150 to generate a trained ensemble of machine learning models 160. The trained ensemble of machine learning models 160 can then be used to select the most optimal parameters of the mechanism that maximizes either or both revenue and number of sellers of the platform.

In some implementations, the ensemble of machine learning models 120 can be Gradient Boosted Trees (GBT), and the techniques discussed herein can be used to determine a reasonable gradient for the GBT. In general, a GBT is a machine learning technique for optimizing the predictive value through successive steps of the training process. Each iteration of training the GBT involves adjusting the values of the trainable parameters of the GBT applied to each of the input variables being used to generate a predicted value with the goal of minimizing the loss (the measure of difference between the predicted and actual target values). The gradient is the incremental adjustment made in each step of the process, and boosting is a method of accelerating the improvement in predictive accuracy to a sufficiently optimum value. If the ensemble of machine learning models 120 is a GBT, the training engine 140 generates successive machine learning models of the ensemble of machine learning models 120 based on the natural gradient generated using the gradient computing apparatus 155.

In some situations, the ensemble of machine learning models can be an ensemble of ranking models that rank items using relationships (e.g., similarities) between features of an input query (e.g., text or image) and features of items listed with an e-commerce site (or another site, such as a search engine). In other situations, the ensemble of machine learning models can be ensemble of counterfeiting models that output a probability of an item being counterfeit (e.g., a knockoff that looks like an item from one source, but offered by a different source) based on features of a candidate item input to the counterfeiting models. For example, the probability that a candidate item is counterfeit can be based on differences between features of the candidate item and features of the item offered by the official source (e.g., seller or brand) of the item.

The black box optimization apparatus 100, in order to improve the fitness of the predictive value 126, trains the ensemble of machine learning models 120 based on the natural gradient generated using the gradient computing apparatus 155. Typically, gradients can be computed exactly through direct derivation of the underlying loss function. As the fitness function is a black box and consequently there is a lack of access to the analytical gradient, the black box optimization apparatus 100 approximates the gradient using the gradient computing apparatus 155. The training engine 140 can train the ensemble of machine learning models 120 to optimize a maximum expected fitness using the natural gradient computed (e.g., estimated or derived) by the gradient computing apparatus 155 in the space of the predicted values 126 that can be represented by:

$$\nabla_{\hat{y}} E_{\epsilon \sim N(0,1)} F(\hat{y} + \sigma \epsilon) = \frac{1}{\sigma} E_{\epsilon \sim N(0,1)} F(\hat{y} + \sigma \epsilon) \epsilon \qquad 1$$

where the predicted value $$\hat{y} = \sum_{i=0}^{j} M_i(X), \, M_i$$

is the ensemble of machine learning models 120 during the i-th training iteration, $\sigma$ is the standard deviation of a zero centered isotropic Gaussian distribution of the predicted value 126. In other words, the predicted value 126 of the ensemble of machine learning models 120 is perturbed stochastically with Gaussian noise to compute the natural gradient in the space of predicted values 126. For example, the gradient computing apparatus 155 can generate two or more altered predicted value by altering the predicted value 126 two or more times based on the standard deviation of the zero centered isotropic Gaussian distribution. For example, the gradient computing apparatus 155 can sample multiple values from the isotropic Gaussian distribution. The sampled values can be either added or subtracted from the predicted values 126 to generate two or more altered predicted values. The gradient computing apparatus 155 can then provide, as input to the fitness function F, the two or more altered predicted values and receive, as output, a respective fitness value. Based on the two or more fitness values, the gradient computing apparatus 155 can determine a pattern (in this case a natural gradient) that maximizes the fitness values.

For supervised learning problems such as regression and classification, the training process implemented by the training engine 140 can train the ensemble of machine learning models 120 using gradient generated by the gradient computing apparatus 155 that minimizes the loss computed using the predicted values 126 and true values (also referred to as target values or dependent values). In such implementations, the loss can be computed as a difference between the predicted values 126 and the true value. For example, the loss can measure the accuracy of the ensemble of machine learning models 120 that can be computed as a mean squared error (MSE) between the predicted values and the true value. In such cases, the gradient is computed using a direct differentiation of the loss value with respect to the parameters. However, according to the techniques described in this specification, the gradient can be estimated by the gradient computing apparatus 155 using the black box system 150. For example, the gradient computing apparatus 155 can perturb the loss generated by the ensemble of machine learning models 120 to generate two or more perturbed loss values. The perturbed loss values can be provided as input to the fitness function F to generate, a corresponding fitness value from where the natural gradient can be determined.

For example, based on the history of values of the parameters of the mechanism to assign priority, an ecommerce platform can generate a training dataset 105 that includes multiple samples, where each sample can include the parameter values and the revenue collected by the platform because of the parameter values. During training, the ensemble of machine learning models 120 can process the parameters of the samples from the training dataset 105 to generate predicted values as an approximation to the revenue that will result. The gradient computing apparatus 155 can compute the loss value as the difference between the predicted values and the revenue. The gradient computing apparatus 155 then perturbs the loss values and provides the perturbed values as input to the fitness function F that generates a fitness values. The gradient computing apparatus 155 can then determine the gradient based on the fitness of perturbed values that can be used to minimize the loss of the ensemble of machine learning models 120 thereby maximizing the fitness value.

During each step of the training process, the training engine 140 of the black box optimization apparatus 100 can train the ensemble of machine learning models 120 in a way that maximizes the expected fitness of the fitness function F. Since the analytical gradient cannot be computed, the training engine 140 can generate the ensemble of machine learning models 120 based on the natural gradient computed via equation 1. For example, if the ensemble of machine learning models 120 is a GBT, then during each iteration of the training process, a training engine 140 adds a new machine learning model (a weak learner) to the ensemble of machine learning models 120 that maximizes the expected fitness of the fitness function F. This can be represented using the following equation:

$$M_{i+1}(X) = \text{argmin}_{m \in M} \left( \sum_{i=0}^{j} M_i(X) \right) - \gamma \nabla_{\hat{y}} \qquad 2$$

where m is a supervised learning algorithm for model M, and $\gamma$ is the learning rate.

The process of deriving a gradient using equations 1 and 2 provides a number of benefits. For example, the gradient is being computed in space of dependent values (also referred to as a label space), which decouples the gradient computation from the model parameterization. This avoids the increased computational requirements that would normally result as the parameters of the model increases. For example, the gradient is computed using the predicted value 126 of the ensemble of machine learning models 120 and not the parameters X of the training samples.

In some implementations, rather than computing natural gradients for each training sample 106 of the training dataset 105, the gradient computing apparatus 155 can compute an estimate of the natural gradient for one or more batches of randomly selected subset of the training samples 106 of the training dataset 105. For example, rather than computing the gradients once per update, the second order derivative can instead be approximated by updating the predicted value 126 multiple times for each batch update, approximating stochastic gradient descent in label space. In such implementations, the natural gradient can be computed using the following equations:

$$\nabla_{\hat{y}i} = \frac{F(\hat{y} + \sigma\epsilon)\epsilon}{\sigma} - \hat{y}_i \qquad 3$$

$$\hat{y}_{i+1} = \hat{y}_i - \gamma\nabla_{\hat{y}i} \qquad 4$$

$$\nabla_{\hat{y}} = \hat{y}_0 - \hat{y}_{n\_rollouts} \qquad 5$$

where $\hat{y}_0 = \hat{y}$, $\gamma$ is the rollout learning rate and n_rollouts is the number of rollouts.

In such implementations, the training engine 140 repeatedly samples batches of training samples such that each batch includes two or more training samples. For each training sample in a batch, the training engine 140 then generates predicted values 126 using the ensemble of machine learning model 120. The gradient computing apparatus 155 then perturbs each of the predicted values 126 to generate perturbed values and provides the perturbed values as input to the fitness function F of the black box system 150 that generates a corresponding fitness value, as output 175. The gradient computing apparatus 155 then computes for each predicted value 126, a natural gradient based on the fitness values. The gradient computing apparatus 155 can likewise iterate though all the training samples 105 of the batch and generate a corresponding natural gradients. Once the corresponding natural gradients are generated for all the training samples in the batch, the gradient computing apparatus can determine a combined natural gradient using the corresponding natural gradients. For example, the combined natural gradient can be computed as an average of the corresponding natural gradients.

The training engine 140 then trains the ensemble of machine learning models 120 that includes adding new machine learning models to the existing ensemble of machine learning models 120 based on the combined natural gradient. The process can be repeated for a specified number of times that can be based on either the number of batches or is specified by the user (e.g., administrator) of the system 100. In some implementations, the training engine 140 can repeatedly sample batches of training samples, compute the combined natural gradient, and train the ensemble of machine learning models 120 until the combined natural gradient is below a specified threshold, which can be specified by the user of the system 100.

FIG. 2 is a flow diagram of an example process 200 of optimizing a black box model. The optimization of the black box system is carried out by performing one or more iterations of a sequence of operations, which can include generating an output of the system, generating a predicted value, determining a natural gradient, and training an ensemble of machine learning models using the training dataset and the natural gradient. Operations of the process 200 can be implemented, for example, by the training engine 140. Operations of the process 200 can also be implemented as instructions stored on one or more computer readable media, which may be non-transitory, and execution of the instructions by one or more data processing apparatus can cause the one or more data processing apparatus to perform operations of the process 200.

The black box optimization apparatus 100 obtains a fitness function (202). The black box optimization apparatus 150 can be used to optimize a system that can only be evaluated using the input provided to the system and the output generated by the system since the underlying fitness (or relationship) of the input and the output is unknown. For example, the unknown underlying relationship of the parameters of the mechanism of assigning priority of the ecommerce platform with the revenue and/or the number of sellers of the ecommerce platform is a black box system 150 where the unknown closed form solution of how the features affect the revenue or the number of sellers is the fitness function F.

The black box optimization apparatus 100 obtains a training dataset for the black box system (204). The training dataset can be obtained, for example, from a training dataset database, or other storage device. To evaluate a black box system 150, the black box optimization apparatus 100 obtains a training dataset 105 that includes multiple training samples 106 where each sample can include multiple features (or parameters). For example, the multiple features can be the parameters of the mechanism of assigning priority by the ecommerce platform to the different products provided by different sellers.

As part of the sequence of operations, the training engine 140 of the black box optimization apparatus 100 generates a predicted value 126 for each training sample of the training dataset (206). For example, while training the ensemble of machine learning models 120, the training engine 140 of the black box optimization apparatus 100 can generate a predicted value 126 corresponding to each training sample 106 of the training dataset 105. For example, training engine 140 can provide, as input to the ensemble of machine learning models 120, each of the multiple training sample 106 that generates a corresponding predicted value 126. For example, the training engine 140 can generate the predicted value $$\hat{y} = \sum_{i=0}^{j} M_i(X)$$

where $M_i$ is the ensemble of machine learning models 120 for a corresponding training sample X.

The training engine 140 determines a natural gradient based on the output of the black box system and the predicted value (208). For example, the gradient computing apparatus 155 can perturb the predicted value 126 of the ensemble of machine learning models with Gaussian noise to compute the natural gradient that maximizes the expected fitness using equation 1:

$$\nabla_{\hat{y}} E_{\epsilon \sim N(0,1)} F(\hat{y} + \sigma\epsilon) = \frac{1}{\sigma} E_{\epsilon \sim N(0,1)} F(\hat{y} + \sigma\epsilon)\epsilon \qquad 1$$

where $\nabla_{\hat{y}}$ is the natural gradient, the predicted value $$\hat{y} = \sum_{i=0}^{j} M_i(X), M_i$$

is the ensemble of machine learning models 120 during the i-th training iteration, $\sigma$ is the standard deviation of a zero centered isotropic Gaussian distribution of the predicted value 126.

When the training process of the ensemble of machine learning models 120 is implemented using batches of training samples then during each iteration of the training process, the training engine 140 samples a batch of training samples from the multiple training samples 106 of the training dataset 105. The training engine 140 can provide, as input to the ensemble of machine learning models 120, each of the multiple training samples 106 from the batch that generates a corresponding predicted value 126. The gradient computing apparatus 155 can then perturb each of the predicted values 126 to generate perturbed values and provides each of the perturbed values as input to the fitness function F that generates a corresponding fitness values. The gradient computing apparatus 155 then computes using a corresponding natural gradient using the corresponding fitness values. Once the natural gradients are generated for all the training samples in the batch, the gradient computing apparatus 115 can determine a combined natural gradient (e.g., average of the corresponding natural gradients) using the corresponding natural gradient.

In contrast, if the training process is not implemented using batches (which also means that the batch size is 1), then during each training iteration the predicted value is used to compute the natural gradient and generate successive machine learning models of the ensemble of machine learning models 120.

If the training process is implemented using batches of training samples, the training engine 140 can also compute an estimate of the natural gradient for each batch during each iteration of the training process. In such implementations, the natural gradient can be computed using the following equations 3, 4 and 5.

$$\nabla_{\hat{y}i} = \frac{F(\hat{y} + \sigma\epsilon)\epsilon}{\sigma} - \hat{y}_i \qquad 3$$

$$\hat{y}_{i+1} = \hat{y}_i - \gamma\nabla_{\hat{y}i} \qquad 4$$

$$\nabla_{\hat{y}} = \hat{y}_0 - \hat{y}_{n\_rollouts} \qquad 5$$

where $\hat{y}_0 = \hat{y}$, $\gamma$ is the rollout learning rate and n_rollouts is the number of rollouts.

The training engine 140 trains the ensemble of machine learning models using the training dataset and the natural gradient (210). For example, the training engine 140, during each iteration of the training process, samples a batch of training samples and computes an estimate of the natural gradient (e.g., combined natural gradient) and trains the ensemble of machine learning models 120 by adjusting the trainable parameters, including adding new machine learning models to the existing ensemble of machine learning models 120. The training engine 140 repeatedly iterates over the training process for a specified number of times that can be specified by the user (e.g., administrator) of the system 100 to generate the trained ensemble of machine learning models 160.

In another example, the training engine 140 can repeatedly sample batches of training samples, compute an estimate of the natural gradient and train the ensemble of machine learning models 120 until the estimate of the natural gradient is below a specified threshold that can be specified by the user of the system 100 to generate the trained ensemble of machine learning models 160. The training process of the ensemble of machine learning model is further explained with reference to FIG. 3.

Figure 3:
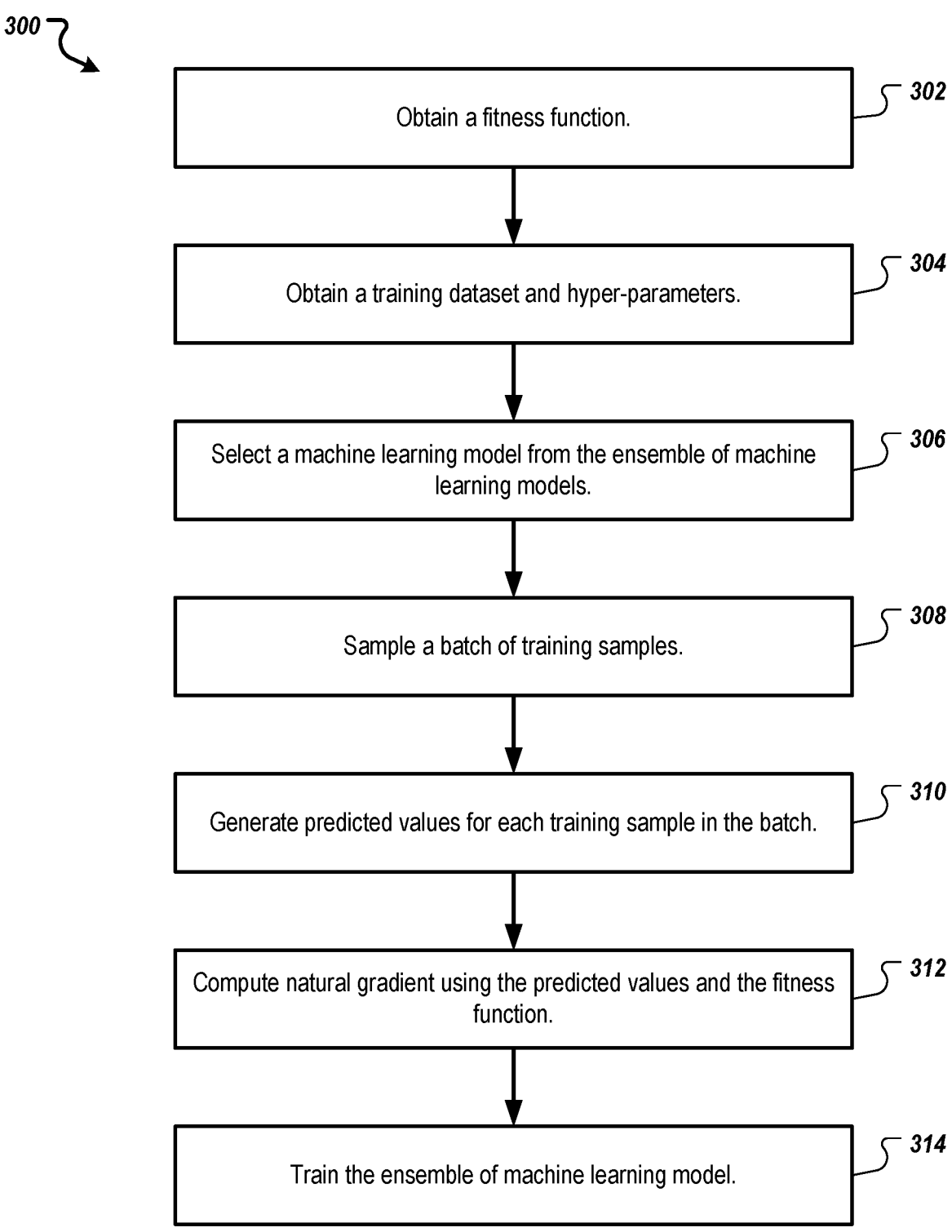
FIG. 3 is a flow diagram of an example process of training the ensemble of machine learning model using the black box system.

FIG. 3 is a flow diagram of an example process 300 of training the ensemble of machine learning models. Operations of the process 300 can be implemented, for example, by the training engine 140. Operations of the process 300 can also be implemented as instructions stored on one or more computer readable media, which may be non-transitory, and execution of the instructions by one or more data processing apparatus can cause the one or more data processing apparatus to perform operations of the process 300.

The black box optimization apparatus 100 obtains a fitness function (302). As mentioned before, the black box system 150 can only be evaluated using the input provided to the system and the output generated by the system since the underlying fitness (or relationship) of the input and the output is unknown.

The black box optimization apparatus 100 obtains a training dataset 105 for the black box system 150 and the hyper-parameters of the ensemble of machine learning models 120 (304). To train the ensemble of machine learning models 120 using a black box system 150, the black box optimization apparatus 100 obtains a training dataset 105 from a training dataset database, or other storage device that includes multiple training samples 106 where each sample can include multiple parameters. The training dataset 105 can be based on historical records of the parameter values.

The black box optimization apparatus can also select one or more hyper-parameters of the ensemble of machine learning models 120. For example, the one or more hyper-parameters can include shrinkage rate and batch size. Other hyper-parameters can be specific to the machine learning models of the ensemble of machine learning models 120. For example, hyper-parameters specific to GBT include maximum depth of trees, maximum parameters to consider while searching for best split, minimum training samples required in a node of a GBT before splitting etc.

The training engine 140 selects a machine learning model from the ensemble of machine learning models 120 (306). Training an ensemble of machine learning models is an iterative process that includes optimizing the predictive value through successive steps of the training process. Each iteration of training the GBT involves adjusting the values of the trainable parameters of the GBT applied to each of the input variables being used to generate a predicted value with the goal of minimizing the loss (the measure of difference between the predicted and true values). The gradient is the incremental adjustment made in each step of the process, and boosting is a method of accelerating the improvement in predictive accuracy to a sufficiently optimum value. If the ensemble of machine learning model 120 is a GBT, the training engine 140 generates successive machine learning models of the ensemble of machine learning models 120 based on the natural gradient generated using the gradient computing apparatus where each successive machine learning model of the ensemble of machine learning models 120 aims at minimizing the loss generated by the prior machine learning model of the ensemble of machine learning models 120.

The training engine 140 samples a batch of training samples from the training dataset (308). For example, the training engine 140 according to the hyper-parameter batch size, can repeatedly sample training samples 106 from the training dataset 105 to generate multiple batches of training samples. Depending upon the implementation and/or the design choice of the user, the training engine 140 can use different sampling strategies. For example, random sampling, stratified sampling etc. For example, if the batch size is 256, the training engine 140 can repeatedly sample 256 training samples from the training dataset 105, to generate multiple batches of training samples such that each batch includes 256 training samples.

The training engine 140 generates predicted values for each training sample in a batch (310). For example, during a particular iteration of the training process, the training engine 140 provides as input to the ensemble of machine learning models 120, each of the training samples of the batch. For each training sample, the ensemble of machine learning models 120 generates as output, a predicted value 126. For example, if the batch includes 256 training samples 106, then during the particular iteration of the training process, the training engine 140 can iteratively or simultaneously (by initiating multiple instances of the ensemble of machine learning models 120) provide the 256 training samples as input to the ensemble of machine learning models 120 and generate 256 predicted values.

The gradient computing apparatus 155 computes the natural gradient based on the predicted values and the fitness function (312). For example, the gradient computing apparatus 155 can then perturb each of the predicted values 126 to generate perturbed values and provide each of the perturbed values as input to the fitness function F that generates a corresponding fitness values. The gradient computing apparatus 155 then computes using a corresponding natural gradient using the corresponding fitness values. Once the natural gradients are generated for all the training samples in the batch, the gradient computing apparatus 115 can determine a natural gradient as a combined natural gradient e.g., average of the corresponding natural gradients. If the training process is implemented using batches of training samples, the training engine 140 can also compute an estimate of the natural gradient for each batch during each iteration of the training process using the equations 3, 4 and 5.

For example, during the particular training iteration and with a batch size of 256, the gradient computing apparatus 155 can perturb each of the predicted values of the corresponding training sample to generate two or more perturbed values. The perturbed values are provided as input to the fitness function F that generates a fitness value. Using the two or more perturbed values corresponding to a predicted value 126, the gradient computing apparatus 155 can determine a gradient that maximizes the fitness value in the space of fitness values. The slope computing apparatus 155 can iteratively determine a gradient for each of the 256 predicted values 256. Finally the slope computing apparatus can calculate a natural gradient by averaging the 256 gradients.

The training engine 140 trains the ensemble of machine learning models (314). For example, during the particular iteration the training engine 140 can add a new machine learning model to the ensemble of machine learning model 120 that maximizes the fitness value generated by the fitness function using the natural gradient. If the natural gradient is below a specified threshold, the training process terminates generating a trained ensemble of machine learning model 160. If the natural gradient is above the specified threshold, the training process initiates a new subsequent training iteration. If the next training iteration is above a specified limit, the training process terminates generating a trained ensemble of machine learning model 160.

While inferring from the trained ensemble of machine learning models 160, the trained machine learning model 160 is provided, as input, samples that includes parameters similar to the training samples. The trained machine learning model 160, in response, generates corresponding predicted values 126 that can be used to determine whether the parameters that were provided as input to the trained ensemble of machine learning models 160 are optimum. For example, assume that the trained ensemble of machine learning model 160 is trained to estimate the revenue and the total number of sellers. In such an implementations, one or more samples of parameters of the mechanism of assigning priority can be provided as input to the trained ensemble of machine learning models 160 to generate the corresponding revenue and the number of sellers. Finally, based on the generated revenue and the number of sellers one of the samples can be selected e.g., sample of features that simultaneously generates the maximum revenue and the number of sellers.

Figure 4:
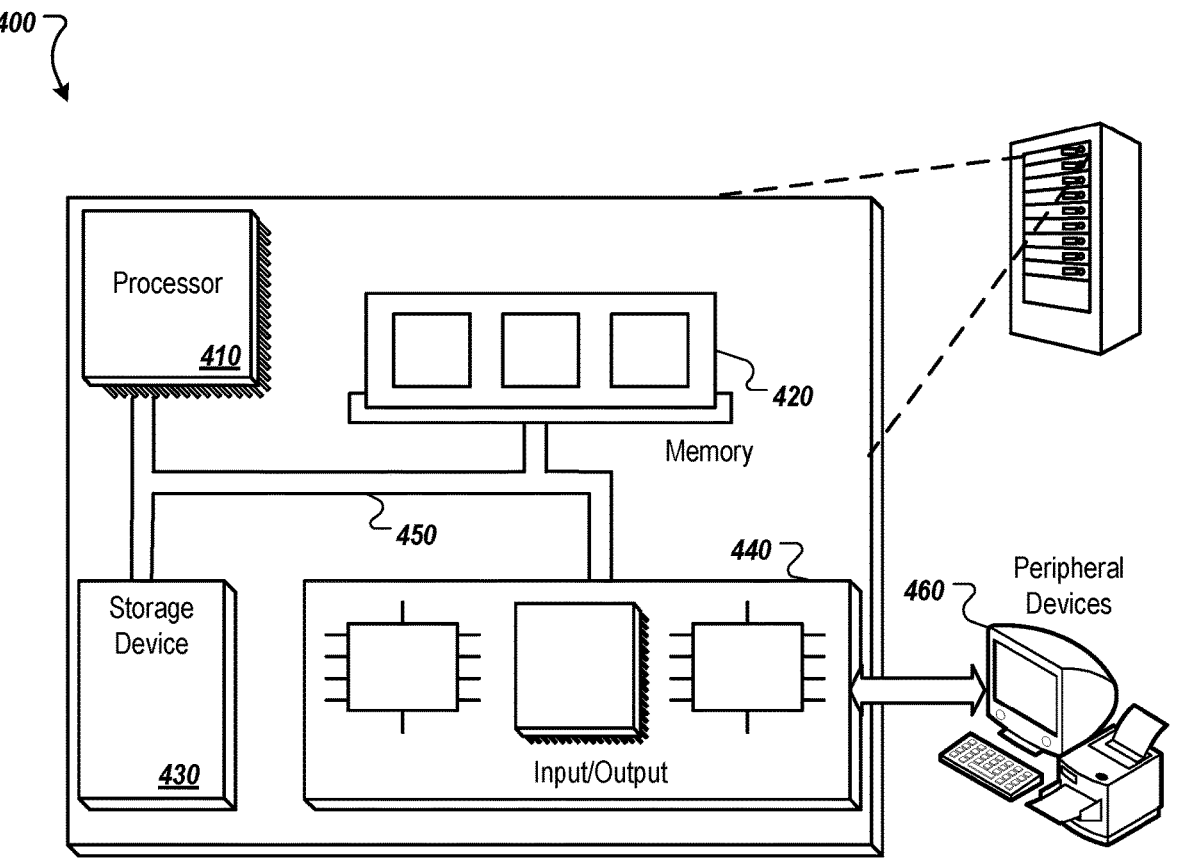
FIG. 4 is a block diagram of an example computer system that can be used to perform operations described.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 460, e.g., keyboard, printer and display devices. Other implementations, however, can also be used, such as mobile computing devices, mobile communication devices, set-top box television client devices, etc.

Although an example processing system has been described in FIG. 3, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

obtaining a training dataset comprising multiple training samples, wherein each training example comprises a plurality of features;

performing, by one or more computing devices, one or more iterations of a sequence of operations, comprising:

generating, for each of the multiple training samples and using an ensemble of machine learning models, a predicted model output value;

for each predicted model output value, perturbing, two or more times, the predicted model output value by adding noise, resulting in multiple perturbed predicted values for each predicted model output value;

determining a natural gradient for each of the multiple training samples based on the multiple perturbed predicted values and an output of a black box system, wherein the natural gradient is determined in a space of dependent values decoupled from model parameterization;

training the ensemble of machine learning models using the training dataset and the natural gradient determined based on the multiple perturbed predicted values and the output of the black box system; and selecting, using the trained ensemble of machine learning models, a set of black box system parameters that optimizes the black box system.

2. The computer-implemented method of claim 1, wherein perturbing, two or more times, the predicted model output value is performed based on a zero-centered Gaussian distribution parameterized by standard deviation $\sigma$.

3. The computer-implemented method of claim 1, wherein the ensemble of machine learning models comprises Gradient Boosted Trees.

4. The computer-implemented method of claim 1, wherein: training the ensemble of machine learning models comprises training an ensemble of ranking models that rank items using features of an input query.

5. The computer-implemented method of claim 1, wherein training the ensemble of machine learning models comprises training an ensemble of counterfeiting models that output a probability of an item being a counterfeit based on features of a candidate item input to the ensemble of counterfeiting models.

6. A system, comprising:

a memory device; and one or more processors configured to interact with the memory device and configured to perform operations, including:

obtaining a training dataset comprising multiple training samples, wherein each training example comprises a plurality of features;

performing one or more iterations of a sequence of operations, comprising:

generating, for each of the multiple training samples and using an ensemble of machine learning models, a predicted model output value;

for each predicted model output value, perturbing, two or more times, the predicted model output value by adding noise, resulting in multiple perturbed predicted values for each predicted model output value;

determining a natural gradient for each of the multiple training samples based on the multiple perturbed predicted values and an output of a black box system, wherein the natural gradient is determined in a space of dependent values decoupled from model parameterization;

training the ensemble of machine learning models using the training dataset and the natural gradient determined based on the multiple perturbed predicted values and the output of the black box system; and selecting, using the trained ensemble of machine learning models, a set of black box system parameters that optimizes the black box system.

7. The system of claim 6, wherein perturbing, two or more times, the predicted model output value is performed based on a zero-centered Gaussian distribution parameterized by standard deviation $\sigma$.

8. The system of claim 6, wherein the ensemble of machine learning models comprises Gradient Boosted Trees.

9. The system of claim 6, wherein:

training the ensemble of machine learning models comprises training an ensemble of ranking models that rank items using features of an input query.

10. The system of claim 6, wherein training the ensemble of machine learning models comprises training an ensemble of counterfeiting models that output a probability of an item being a counterfeit based on features of a candidate item input to the ensemble of counterfeiting models.

11. A non-transitory computer readable medium storing instructions that, when executed by one or more data processing apparatus, cause the one or more data processing apparatus to perform operations comprising:

obtaining a training dataset comprising multiple training samples, wherein each training example comprises a plurality of features;

performing, by one or more computing devices, one or more iterations of a sequence of operations, comprising:

generating, for each of the multiple training samples and using an ensemble of machine learning models, a predicted model output value;

for each predicted model output value, perturbing, two or more times, the predicted model output value by adding noise, resulting in multiple perturbed predicted values for each predicted model output value;

determining a natural gradient for each of the multiple training samples based on the multiple perturbed predicted values and an output of a black box system, wherein the natural gradient is determined in a space of dependent values decoupled from model parameterization;

training the ensemble of machine learning models using the training dataset and the natural gradient determined based on the multiple perturbed predicted values and the output of the black box system; and selecting, using the trained ensemble of machine learning models, a set of black box system parameters that optimizes the black box system.

12. The non-transitory computer readable medium of claim 11, wherein perturbing, two or more times, the predicted model output value is performed based on a zero-centered Gaussian distribution parameterized by standard deviation $\sigma$.

13. The non-transitory computer readable medium of claim 11, wherein the ensemble of machine learning models comprises Gradient Boosted Trees.

14. The non-transitory computer readable medium of claim 11, wherein training the ensemble of machine learning models comprises training an ensemble of ranking models that rank items using features of an input query.

15. The non-transitory computer readable medium of claim 11, wherein training the ensemble of machine learning models comprises training an ensemble of counterfeiting models that output a probability of an item being a counterfeit based on features of a candidate item input to the ensemble of counterfeiting models.

\* \* \* \* \*